United States Patent

Windecker

[15] 3,666,850

[45] May 30, 1972

[54] PACKAGING METHOD AND APPARATUS

[72] Inventor: Leo J. Windecker, Midland, Tex.

[73] Assignee: The Dow-Chemical Company, Midland, Mich.

[22] Filed: July 10, 1969

[21] Appl. No.: 845,658

Related U.S. Application Data

[63] Continuation of Ser. No. 595,678, Nov. 21, 1966, abandoned.

[52] U.S. Cl. .................................264/45, 264/51, 264/53, 18/5
[51] Int. Cl. ...........................................B29d 9/00
[58] Field of Search ..........................264/51, 53, 45; 18/5

[56] References Cited

UNITED STATES PATENTS

| 2,981,984 | 5/1961 | Orr | 264/45 |
| 3,278,658 | 10/1966 | Immel | 264/51 |
| 3,280,472 | 10/1966 | Lorenign | 264/51 |
| 3,394,797 | 7/1968 | Flannigan | 264/45 |
| 3,446,882 | 5/1969 | Landon | 264/45 |

Primary Examiner—Julius Frome
Assistant Examiner—Leon Garnett
Attorney—Griswold & Burdick, Robert B. Ingraham and William D. Miller

[57] ABSTRACT

Method and apparatus are disclosed for packaging wherein expandable plastic particles are heated in an applicator gun to a temperature sufficient to cause expansion and to cause softening of the surface. The particles are carried by a hot gas stream and deposited as a coherent mass about an object to be packaged.

4 Claims, 1 Drawing Figure

Patented May 30, 1972 3,666,850
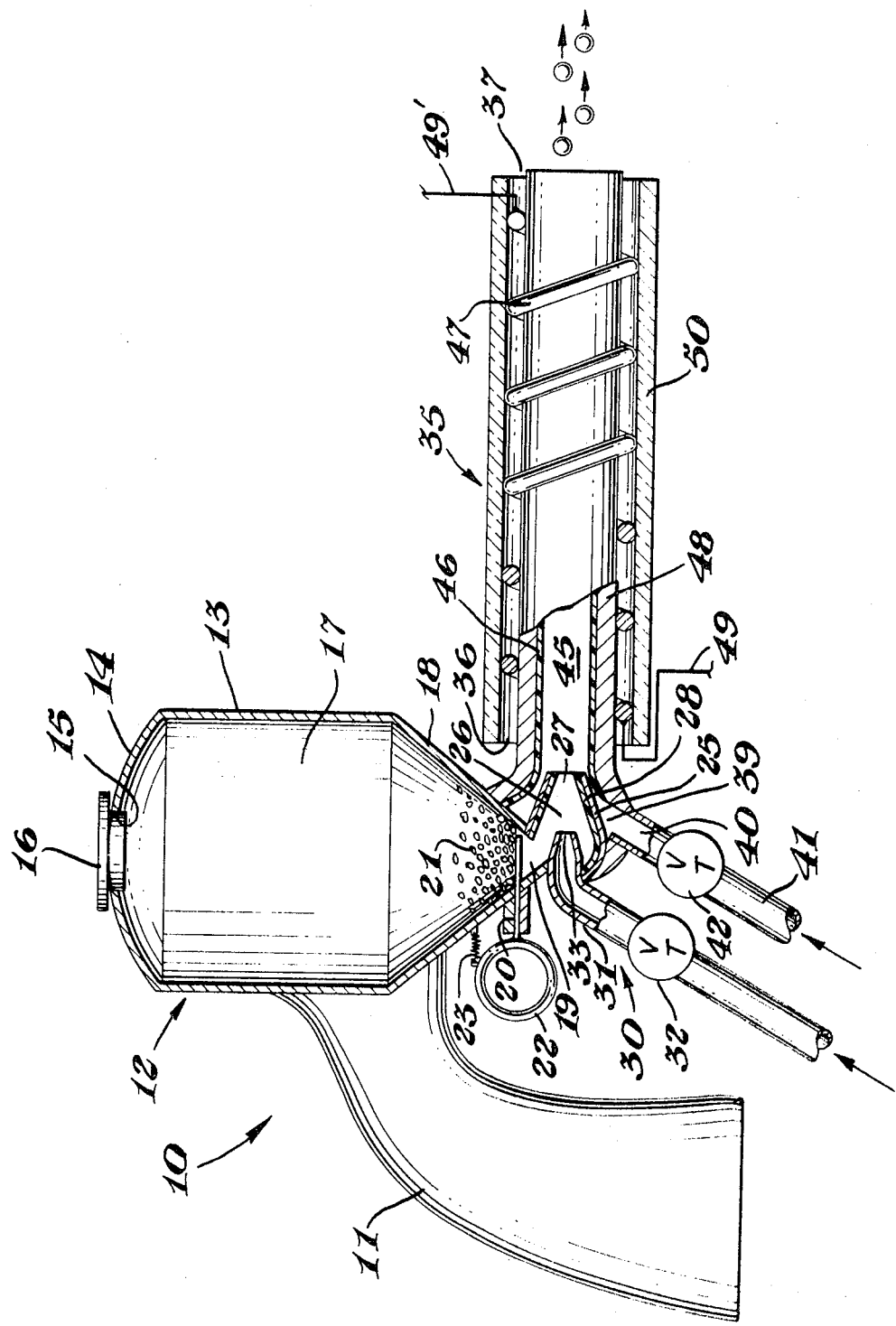
INVENTOR.
Leo J. Windecker
BY Robert R Ingraham
AGENT

PACKAGING METHOD AND APPARATUS

This is a continuation of the parent case Ser. No. 595,678, filed Nov. 21, 1966, now abandoned.

This invention relates to a method and apparatus for packaging, and more particularly relates to a method and apparatus for packaging employing expandable synthetic resinous thermoplastic particles.

Plastic foams are widely used in the packaging field to provide cushioning for formed or molded packages which conform to intricate articles and oftentimes to provide a container having a low weight and an interior which conforms to the article or body being packaged. Frequently, such containers are molded from expandable synthetic resinous particles such as polystyrene particles containing a volatile fluid foaming agent such as pentane. Usually, such molding is accomplished by heating a plurality of expandable or partially expanded particles in a mold by means of steam to provide the package or container components having the desired configuration to receive an article. Such procedures oftentimes are entirely satisfactory where the article being packaged is protected from moisture, is insensitive to moisture or when the molded package components have had the residual moisture removed therefrom. Oftentimes, it is desired to package specialty articles in low volume in a protective mass of foam. However, such a procedure is oftentimes economically undesirable in that it is much too expensive to form a suitable mold for a particular container component if it is desired to package relatively few articles. Frequently, instruments, instrument components, controls, control components, delicate machined materials, specialty glassware items and the like must be packaged for shipping and are produced in relatively small quantities that do not permit, for economic reasons, the fabrication of a unitary foamed package. Oftentimes, the conventionally foamed package or packing must be moisture free in order to avoid corrosive or other deleterious effects upon the component or article being packaged.

It would be beneficial if there were available an improved method and apparatus for the preparation of expanded synthetic resinous bodies which encapsulate an article to be shipped.

It would also be desirable if there were available an improved method and apparatus which were capable of providing a unitary foamed body about an article which was generally moisture-free.

It would also be desirable if there were available an improved method and apparatus which would permit the formation of synthetic resinous foamed bodies in small quantities or singly at minimal expense.

These benefits and other advantages in accordance with the method of the present invention are achieved in a method for encapsulating an article within a unitary body of cellular synthetic resinous thermoplastic material, the steps of the method comprising providing an article to be at least partially encapsulated within a synthetic resinous body, providing a plurality of heat expandable thermoplastic synthetic resinous particles, heating the synthetic resinous particles to a temperature sufficient to cause them to expand and to cause the surface of the particles to adhere at least to like particles, propelling the heated particles in a gas stream, the gas being generally a non-solvent for the resinous particles, toward the object to be encapsulated causing the expanded heat plastified particles to contact and adhere together about at least a desired portion of the article to be encapsulated and form a unitary body.

Also contemplated within the scope of the present invention is an apparatus, the apparatus comprising in cooperative combination means to provide a stream of heat expandable synthetic resinous thermoplastic particles, means to provide a stream of a generally inert gas so constructed and arranged so as to entrain the stream of expandable particles, means to heat the expandable particles to an expanding temperature and heat plastify at least a surface portion thereof and means to propel the heat plastified expanded synthetic resinous particles in a desired direction.

Further features and advantages of the present invention will become more apparent from the following specification taken in connection with the drawing wherein:

The FIGURE shows a sectional view of an apparatus in accordance with the invention.

In the FIGURE there is depicted schematically a sectional view of an apparatus in accordance with the present invention generally designated by the reference numeral 10. The apparatus 10 comprises in cooperative combination a handle or support means 11 adapted to be manually grasped and a resin supply means 12 adapted to provide a stream of unexpanded expandable synthetic resinous particles. The supply means 12 comprises a container 13 having a top 14. The top 14 defines a filling opening 15. A closure 16 is disposed within the opening 15. The container 13 defines an internal cavity 17. Remote from the top 14 is a bottom 18 defining a discharge opening or passageway 19. A slide valving member 20 is disposed within the bottom 18 of the container 13 and adapted to regulate the flow of a particulate material 21 disposed within the container 18. The slide valving member 20 has an operating means or finger grip 22 and in operative association with a tension spring 23. The tension spring 23 is affixed to the bottom 18 of the container 13 and to the finger grip 22 in such a manner that the spring causes the valving member 20 to close the discharge passageway 19. A first housing 25 is affixed to the bottom of the container 18. The housing 25 defines an internal space 26 which is in full communication with the passageway 19. The housing 25 defines an exit orifice 27 remotely disposed from the opening 19 and in full communication therewith. The housing 25 has a non-adhering heat resistant synthetic resinous lining 28 such as polytetrafluoroethylene, phenol-formaldehyde and the like. A propelling fluid injection means 30 is in communication with the space 26. The means 30 comprises a conduit 31 in operative communication with a flow regulating means 32. The conduit 31 is in operative communication with a propelling fluid source such as compressed air, not shown. The conduit 31 terminates within the space 26 in an exit orifice 33 which is directed toward and generally coaxial with the orifice 27. The space 26, the orifice 33 and the passageway 19 and the orifice 27 are arranged in such a manner that when the valving member 20 is open a stream of particulate resinous material is entrained within a gas issuing from the orifice 33 and is forced therefrom. A barrel assembly generally designated by the reference numeral 35 is operatively connected to the container 18 and the housing 25. The barrel assembly 35 comprises a first entrance end 36 and a second or discharge end 37. The first end 36 defines a plenum 39 of generally annular configuration surrounding the housing 25. A propelling and/or heating fluid source 40 is in operative communication with the plenum 39. The heating fluid source 40 comprises a conduit 41 having a valve or flow control means 42 disposed therein. The barrel assembly 35 defines an inner passageway 45 providing full communication between the first end 36 and the second end 37 and being generally coaxially disposed with relation to the second end 37. A heat resistant non-adhering synthetic resinous liner 46 (such as polytetrafluoroethylene) provides an inner surface of the barrel assembly 35. A heating means 47 such as an electrical resistance element is disposed about a means 48 defining the passageway 45 and adapted to provide heat thereto. A thermally insulating sleeve 49 is disposed about the heating element 47. The heating element 47 is in operative communication with an electrical power supply means or cables 50 and 51.

In operation of the apparatus shown in the Figure and in the practice of the method of the invention, expandable synthetic resinous particles such as the particles 21 are disposed within the cavity 17. The heating element 47 provides heat to the barrel assembly 35. A propelling fluid is supplied to the conduit 31 and is discharged from the orifice 33, through the orifice 27 and into the passageway 45, the propelling fluid passes through the passageway 45 and is discharged through the second end of the barrel assembly 37. When the barrel assembly 37 is heated to a desired temperature, the valving element 20 is withdrawn by retracting the finger engaging means 22 to provide a stream of particulate expandable thermoplastic particles 21 which are entrained by the propelling fluid stream issuing from the orifice 33. The stream of particulate expandable thermoplastic particles passes through the orifice 27 and through the passageway 45 while being heated to a temperature sufficient to cause expansion thereof and heat plastification of the surface. Particles are discharged from the second end 37 of the barrel assembly 35 and are directed toward the object desired to be packaged. The expanded heat plastified particles contact the object and adhere together to form a casing of desired thickness thereon. After formation of the initial layer, the addition of further heat plastified expanded particles permits building a unitary foam article of almost any desired thickness. Beneficially, if increased rate is desired, heated fluid such as hot air is introduced from the conduit 41 to provide additional foaming capacity. Heat expandable synthetic resinous particles suitable for use in the method and apparatus of the present invention are well known in the art and are set forth in U.S. Pat. No. 2,744,291.

By way of further illustration, an apparatus generally as depicted in the FIGURE is charged with a particulate mass of expandable polystyrene beads containing about 5.5 weight percent isopentane. A glass condenser, to be packed for protection, as for shipment or the like, is placed in a paperboard container is placed at discharge end 37, then heat is supplied to the barrel assembly and air supplied to the conduit 31 in the hereinbefore described manner. The polystyrene particles are heated and discharged toward the glass condenser in the paperboard container while maintaining the second end 37 of the barrel assembly 35 about 8 inches from the condenser. Sufficient expanded heat plastified particles are added to fill the paperboard container and cover the condenser to about a depth of 2 inches. The partially encapsulated condenser and a unitary block of foam formed by the adhering expandable synthetic resinous particles are removed from the paperboard container, inverted and replaced in the container. The remaining space within the container is then filled with adherent particles as hereinbefore described to provide a condenser encapsulated within a unitary body of adhered foamed polystyrene particles, the unitary body completely filling the paperboard container.

In a manner similar to the foregoing illustration, meters, electronic tubes, electronic subassemblies, turbine fans and the like are readily encapsulated within a generally water- or moisture-free foam protective body.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. The method of at least partially encapsulating an article in a unitary body of synthetic resinous thermoplastic foamed polystyrene, the steps of the method comprising:
    positioning an article, at a temperature below the softening temperature of the polystyrene, to be encapsulated within the solid foamed body thereof, at the open discharge end of a substantially cylindrical chamber of a hand-portable gun having a closed inlet end and an open discharge end;
    introducing at a controlled rate, in a falling motion, heat expansible polystyrene hollow beads which are capable of softening, plasticizing, and adhering to each other when heated above the softening temperature of the polystyrene but, when subsequently cooled below said temperature, becoming a solid cellular mass but retaining at least a portion of the expansion, into the chamber of said hand-portable gun near the closed entrance end thereof;
    continuously admitting a divided stream of air heated between about 90° to 110° C above the softening temperature of said polystyrene, one portion of the air entering said gun chamber behind, and admixing directly and promptly with, the falling expansible polystyrene beads to serve principally as a lateral propellant therefor and the other portion of said air entering concentrically of the incoming expansible polystyrene beads near the entrance and end thereof and enveloping and principally suspending the expansible polystyrene beads so propelled which are thereby further caused to expand and to soften, plasticize, and adhere to other like beads contacted thereby while so heated;
    propelling and suspending the heated plasticized expanding polystyrene beads by means of said air streams toward and out the discharge end of said gun chamber;
    depositing the expanded polystyrene beads while the surfaces thereof are still adherent, around the article, which is to be encapsulated, to the extent desired, while said article is maintained below the softening temperature of the polystyrene, thereby to form a unitary mass of solid, cellular, encapsulation composed of the expanded polystyrene particles, conforming to the contour of the article.

2. The method of claim 1 wherein the article is entirely encapsulated within the body of cellular material.

3. The method of claim 1, including the step of placing the article to be partially encapsulated within a configuration prior to providing the heat-expanded polystyrene beads.

4. The method of claim 1, including the step of placing the article on a support means then solidly encapsulating it with a mass of coalescent expanded beads of polystyrene and subsequently removing the article from the support means and completely encapsulating it with the expanded beads.

* * * * *